(12) United States Patent
Carberry et al.

(10) Patent No.: US 7,197,663 B2
(45) Date of Patent: Mar. 27, 2007

(54) CONCURRENT PPRC/FCP AND HOST ACCESS TO SECONDARY PPRC/FCP DEVICE THROUGH INDEPENDENT ERROR MANAGEMENT

(75) Inventors: Frederick J. Carberry, Tucson, AZ (US); Rufus J. Twito, Tucson, AZ (US); James C. Chen, Tucson, AZ (US); Richard A. Schaeffer, Antioch, CA (US); Kaukab Uddin, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 10/719,388

(22) Filed: Nov. 20, 2003

(65) Prior Publication Data

US 2005/0114740 A1 May 26, 2005

(51) Int. Cl.
*G06F 11/00* (2006.01)
(52) U.S. Cl. ....................................................... 714/6
(58) Field of Classification Search .................... 714/6, 714/42; 711/168
See application file for complete search history.

(56) References Cited

U.S. PATENT DOCUMENTS

| | | | |
|---|---|---|---|
| 5,386,517 A * | 1/1995 | Sheth et al. | 710/60 |
| 5,446,871 A * | 8/1995 | Shomler et al. | 714/1 |
| 5,446,872 A * | 8/1995 | Ayres et al. | 714/1 |
| 5,504,861 A * | 4/1996 | Crockett et al. | 714/13 |
| 5,519,883 A * | 5/1996 | White et al. | 710/315 |
| 5,742,792 A * | 4/1998 | Yanai et al. | 711/162 |
| 6,061,805 A * | 5/2000 | Suzuki et al. | 714/2 |
| 6,304,980 B1 * | 10/2001 | Beardsley et al. | 714/6 |
| 6,370,626 B1 * | 4/2002 | Gagne et al. | 711/154 |
| 6,389,554 B1 * | 5/2002 | Jung et al. | 714/6 |
| 6,442,709 B1 * | 8/2002 | Beal et al. | 714/33 |
| 6,499,112 B1 * | 12/2002 | Milillo et al. | 714/6 |
| 6,526,419 B1 * | 2/2003 | Burton et al. | 707/204 |
| 6,542,962 B2 * | 4/2003 | Kodama et al. | 711/114 |
| 6,601,187 B1 * | 7/2003 | Sicola et al. | 714/6 |
| 6,658,590 B1 * | 12/2003 | Sicola et al. | 714/6 |
| 6,694,406 B2 * | 2/2004 | Kodama et al. | 711/114 |
| 6,757,790 B2 * | 6/2004 | Chalmer et al. | 711/147 |
| 6,792,557 B1 * | 9/2004 | Takamoto et al. | 714/7 |
| 6,823,336 B1 * | 11/2004 | Srinivasan et al. | 707/8 |
| 6,842,834 B2 * | 1/2005 | Crockett et al. | 711/162 |
| 6,907,543 B2 * | 6/2005 | Hino et al. | 714/4 |
| 7,051,121 B2 * | 5/2006 | Ohno et al. | 710/5 |

(Continued)

*Primary Examiner*—Bryce P. Bonzo
(74) *Attorney, Agent, or Firm*—Dan Shifrin

(57) ABSTRACT

A method of error management in a data storage system having a target device, with the target device receiving commands from a first initiator and the target device concurrently receiving commands from a second initiator. The target device is typically a storage device operating as a PPRC secondary. A first initiator is a device which communicates with the target device through small computer systems interface (SCSI) protocol. The first initiator is typically a host computer or server. The second initiator communicates with the target device through peer-to-peer remote copy PPRC initiator mode commands. The second initiator is typically a separate storage device in a peer-to-peer remote copy (PPRC) relationship with the target device. The method consists of managing errors associated with a command sent to the target device from the first initiator independently from the management of errors associated with a command sent to the target device from the second initiator.

21 Claims, 2 Drawing Sheets

U.S. PATENT DOCUMENTS

2002/0138696 A1* 9/2002 Kodama et al. ............ 711/114
2003/0159001 A1* 8/2003 Chalmer et al. ............ 711/120
2003/0217119 A1* 11/2003 Raman et al. .............. 709/219
2004/0260873 A1* 12/2004 Watanabe ................... 711/114
2004/0260970 A1* 12/2004 Beardsley et al. ............ 714/6
2005/0160248 A1* 7/2005 Yamagami .................. 711/170

* cited by examiner

CONCURRENT PPRC/FCP AND HOST ACCESS TO SECONDARY PPRC/FCP DEVICE THROUGH INDEPENDENT ERROR MANAGEMENT

TECHNICAL FIELD

The present invention relates to a method, system and article of manufacture for error management allowing concurrent PPRC primary and host to access a PPRC secondary device.

BACKGROUND ART

Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among hosts, storage systems and connecting networking components of the information technology system.

An enterprise storage server (ESS), such as the IBM* TotalStorage Enterprise Storage Server*, may be a disk storage server that includes one or more processors coupled to storage devices, including high capacity scalable storage devices, Redundant Array of Independent Disks (RAID), etc. The enterprise storage servers are connected to a network and include features for copying data in storage systems.

Peer-to-Peer Remote Copy (PPRC) is an ESS function that allows the shadowing of application system data from a first site to a second site. The first site may be referred to as an application site, a local site, or a primary site. The second site may be referred to as a recovery site, a remote site or a secondary site. The logical volumes that hold the data in the ESS at the local site are called local volumes, and the corresponding logical volumes that hold the mirrored data at the remote site are called remote volumes. High speed links, such as ESCON links may connect the local and remote ESS systems.

ESS currently supports a host reading directly from a secondary PPRC device. In addition, a peer-to-peer remote copy over fibre channel protocol (PPRC/FCP) relationship is typically established from a primary storage device to a secondary storage device in a PPRC operating environment. Thus, both the host and the PPRC/FCP primary may have concurrent access to the PPRC/FCP secondary device. In this case, the secondary is a target device for both the primary and an independent Host System.

The contemporaneous access of the host and PPRC primary to the secondary device can give rise to two types of problems. First, commands from the host to the PPRC secondary device can cause error conditions on the PPRC secondary device which, under small computer systems interface (SCSI) protocol, would disrupt the PPRC/FCP relationship between the primary and the secondary. For example, the host may issue a command such as a write that is not supported, an illegal request or invalid command to the PPRC/FCP secondary device. This would result in the command being check conditioned and a contingent allegiance or autocontingent allegiance (CAC/ACA) condition on the secondary PPRC device. Such a condition can inhibit the PPRC/FCP writes from the primary and result in the PPRC pairs suspending and any pending remote copies not completing. Similarly, errors encountered on the PPRC/FCP secondary device, due to the implementation of PPRC/FCP primary commands under SCSI protocol, can be disruptive to host access to the secondary PPRC/FCP device.

These problems cannot effectively be solved using SCSI protocol error handling on the secondary/target device. The host and the PPRC primary are two independent entities attempting to access the same target device. The host and the primary have no direct knowledge of the other's attempt to access the secondary. In the event of a command error on the secondary device under SCSI protocol error handling, both the PPRC primary and the host would be affected by the error and independently attempt error recovery without knowledge or coordination of the other device's error recovery attempts. This uncoordinated error handling can cause further error conditions or disruption of PPRC/FCP secondary access from both the primary and the host. Therefore, a need exists in the art for a method and apparatus to assure concurrent PPRC/FCP primary and host access to a secondary PPRC/FCP device through independent error management.

The present invention is directed to overcoming one or more of the problems discussed above.

SUMMARY OF THE INVENTION

The need in the art is addressed by a method of error management in a data storage system having a target device, with the target device receiving commands from a first initiator and the target device concurrently receiving commands from a second initiator. A first initiator is a device which communicates with the target storage device through small computer systems interface (SCSI) protocol. The first initiator is typically a host computer or server. The second initiator communicates with the target storage device through peer-to-peer remote copy PPRC initiator mode commands. The second initiator is typically a separate storage device in a peer-to-peer remote copy (PPRC) relationship with the target device. The method consists of managing errors associated with a command sent to the target device from the first initiator independently from the management of errors associated with a command sent to the target device from the second initiator.

Preferably, the method of independently managing errors associated with a command sent to the target storage device from each type of initiator consists of determining the initiator type which has issued a command to the target device, and applying a first error recovery procedure to manage errors associated with a command directed to the target device from the first initiator and, similarly, applying a second error recovery procedure to manage those errors associated with a command directed to the target device from the second initiator. The method further consists of preventing errors associated with a command directed to the target device from one of the first initiator and the second initiator from affecting access to the target device by the other of the first initiator and the second initiator.

The method may further consist of allowing only one of the first initiator and the second initiator to have write access to the target device at a select time. In addition, the error recovery procedure implemented for errors associated with a command sent to the target storage device from the first initiator can differ from the error recovery procedure implemented for errors associated with a command sent to the target storage device from the second initiator. Typically, the first initiator is a server, the second initiator is a storage device and the target is a storage device in a PPRC relationship with the second initiator.

A further embodiment of the invention is a target device which is a component of a data storage system, the target device receiving commands from a first initiator and concurrently receiving commands from a second initiator with the target device being capable of causing the above described steps for independently managing errors associated with commands sent from the first or second initiator.

A further embodiment of the invention is an article of manufacture comprising a storage medium having logic embedded therein to cause the components of a data storage system to execute the steps described above for independent error management.

DETAILED DESCRIPTION OF THE PREFERRED EMBODIMENT

Figure 1:
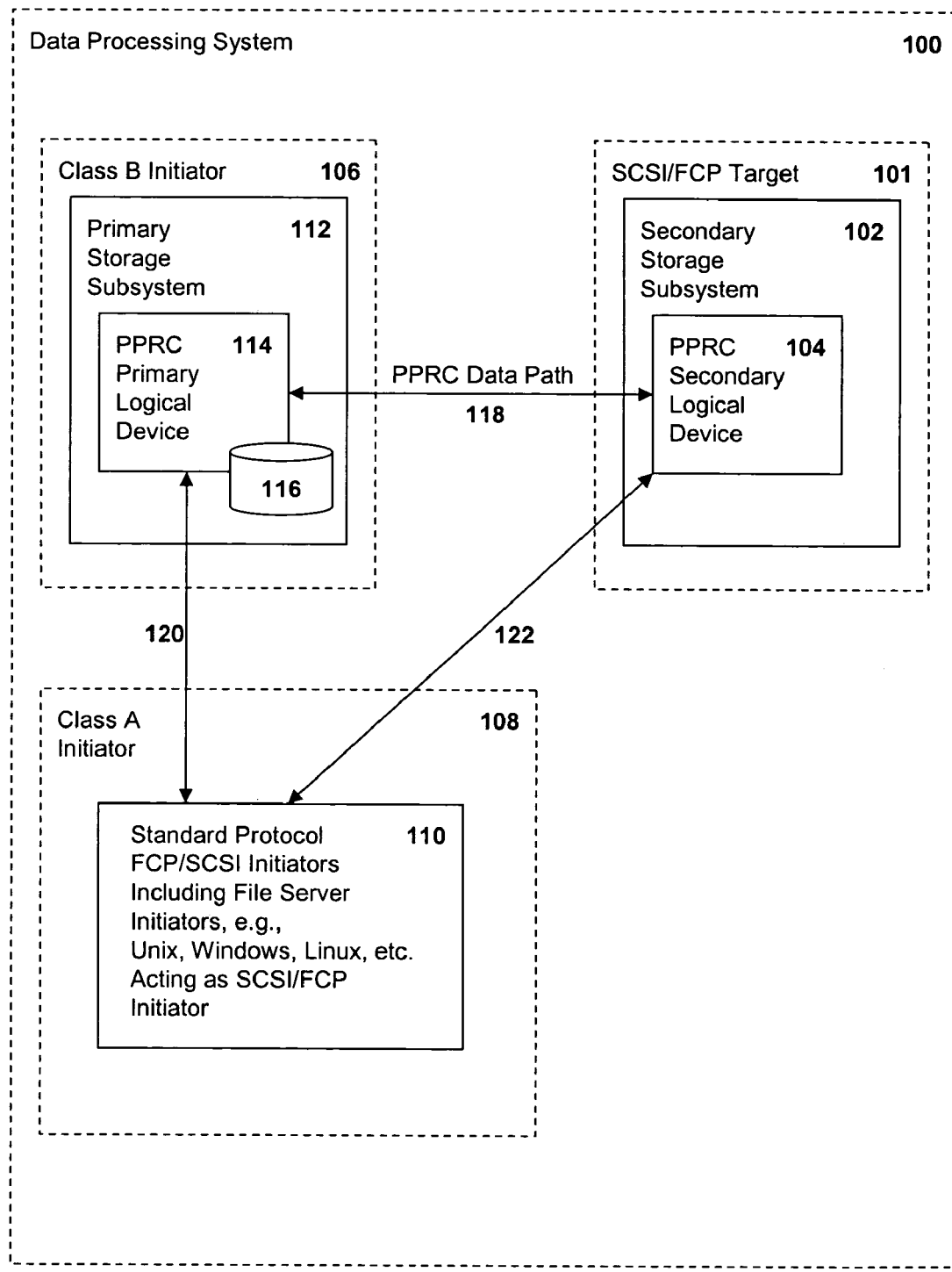
FIG. 1 illustrates a block diagram of a computing environment in accordance with certain described aspects of the invention.

FIG. 1 illustrates a computing environment suitable for implementation of embodiments of the invention. The data processing system 100 of FIG. 1 includes a target device 101 which receives commands through SCSI or FCP protocols. The target device 101, can be a secondary storage subsystem 102 having a PPRC secondary logical device 104. The invention will be described herein with a PPRC/FCP secondary device 104 as the target device 101, however, the invention is applicable to any SCSI like protocol or another transport protocol, such as FCP or iSCSI. The data processing system 100 also has a class B initiator 106 and a class A initiator 108 with both initiators having concurrent access to the target device 101.

A class A initiator 108 is defined herein as a device which initiates input/output operations (I/O) utilizing known SCSI protocols for device access such as FCP. Representative class A initiators include file servers or host computers typically utilizing an operating system such as Unix, Windows, Linux, or similar programs. As defined herein, a class B initiator 106 is a device which initiates I/O operations utilizing PPRC/FCP initiator mode commands which may not be a specified protocol such as SCSI but which initiator mode commands allow the class B initiator 106 and target device 101 to communicate. Typically, a class B initiator 106 is a PPRC primary storage subsystem 112 which has a PPRC primary logical device 114 with primary storage volumes 116. The class B initiator 106 may communicate with the target device 101 over a PPRC data path 118, which is typically a fibre optic connection. The class A initiator 108 may communicate with the class B initiator 106 over a dedicated or shared fibre channel path 120. The class A initiator also communicates with the target device 101 over a dedicated or shared fibre optic connection 122. As described herein, the target device 101 is accessed both by a class A initiator 108 which views the target as a SCSI target device [Logical Unit] and by a class B initiator 106 which views the target as a PPRC/FCP secondary device. The environment in which this invention is implemented could have many Class A initiators and Class B initiators connected in a switched environment such as a Storage Area Network SAN.

Without independent error management, the concurrent access of the target device 101 by both a class A initiator 108 and a class B initiator 106 in the data processing system 100 can give rise to certain errors. For example, a class A initiator 108 may send unsupported or illegal SCSI or FCP commands to the target device 101 which the target rejects, causing SCSI protocol error handling to be initiated on the target device 101. Initiation of SCSI protocol error handling can cause the class B initiator 106 (typically a PPRC/FCP primary logical device 114) to lose access to the PPRC secondary 104. Alternatively, a class B initiator 106 may write to the target device 101 while a class A initiator 108 is concurrently reading from same target device 101. If the class A initiator 108 attempts to drive a SCSI command while the class B initiator 106 write operation is occurring, the target device 101 is likely to reject the class A SCSI command.

The problems described above can be addressed with independent error management by the target device 101 to prevent errors associated with one initiator class from causing errors for the other. Different target mode behavior (error handling) rules can be implemented by the target device 101 depending on which class of initiator issued the command to the target device 101. The target device 101 differentiates which initiator issued a command and can, therefore, manage errors (e.g., device state, command errors) differently for different initiator classes. Fundamentally, initiator error management is implemented by having a class A initiator 108 independently manage errors associated with its commands, and having a class B initiator 106 independently manage errors associated with its commands.

Both class A 108 and class B 106 initiators have error recovery routines which will be performed when error conditions are presented by the target device 101. The target device 101 manages its error states and the presentation of error states to the initiators differently for each initiator class. In addition, maintenance of a fully functioning PPRC relationship between a PPRC primary and a PPRC secondary is critical to maintaining the integrity of data in a PPRC enabled data storage system 100. Therefore, priority is given to class B initiator commands over class A initiator commands when a PPRC relationship is established between a source and target volume in an environment where both types of initiators have access to the same PPRC/FCP secondary target storage device. Thus, a key benefit of independent error management by the target device 101 is to prevent interruption or errors during the data copy commands from a PPRC/FCP primary 114 to a PPRC/FCP secondary device 104. This enables more efficient bandwidth utilization by the copy operation with less error recovery necessary and fewer command failures or timeouts. This, in turn leads to faster more efficient completion of data transfer from a PPRC primary device to PPRC secondary device.

Under independent error management as described herein, only one initiator class may be a writer to the target device 101 at any given time. Although only one class of initiator may have write access, initiators from both classes can be accessing (sending commands) to the target device 101 concurrently.

Errors originating from each class of initiator can be managed differently by the target device 101. Differential error management by the target device 101 can prevent errors from one initiator class affecting or disrupting the access of the other initiator class.

Known SCSI (or FCP) protocols for device access and error handling are observed with respect to a class A initiator 108. These known SCSI protocols are implemented -by the target device 101 and include the use of reservations, contingent allegiance condition (CAC), auto contingent allegiance (ACA), and unit attentions (UA), for example. On the contrary, modified SCSI error handling and recovery protocol procedures are implemented with respect to class B initiators 106.

The modified SCSI error handling and recovery protocol procedures applied to class B initiators are used to prevent class A initiator 108 activity from affecting the class B PPRC/FCP input/output operations to the target device 101. For example, if the target device 101 is reserved to a class B initiator 106 the PPRC/FCP input/output from the PPRC primary 114 to the PPRC secondary device 104 is given priority over commands from a class A initiator 108. Therefore, a class B initiator 106 reservation on the target device 101 is given special priority over normal SCSI reserves (whether traditional or persistent) which may have been made by a class A initiator. Class A reserves are not necessarily broken or removed by a Class B initiator 106, through the class A reserves could be broken or removed. A class A initiator 108 can never release or break a class B reservation on a target device 101 using normal means possible under SCSI protocol, such as a release command or device reset. Unit attention conditions or CAC/ACA conditions on the target device 101 due to class A generated commands are not considered in processing the class B initiator 106 commands, and error conditions which result from the processing of class B initiator 106 commands on the target device 101 do not cause UA or CAC/ACA conditions to be set on the device for class A initiator 108 types.

In summary, specific errors caused by commands to a target device 101 from a class B initiator 106 are handled as follows:

a. Contingent allegiance (CAC) or autocontingent allegiance (ACA) conditions resulting from class B initiator 106 commands or device errors during processing of class B initiator 106 commands do not put the SCSI/FCP target 101 in contingent allegiance/autocontingent allegiance condition with respect to a class A initiator 108.

b. With respect to a unit attention (UA) condition, UA is not set on the SCSI/FCP target 101 for a class A initiator 108 by class B initiator 106 behavior. UA set by a class A initiator 108 does not affect commands by a class B initiator 106 and any class B initiator 106 commands are processed by the SCSI/FCP target 101 as if the UA condition does not exist on the target device 101.

Figure 2:
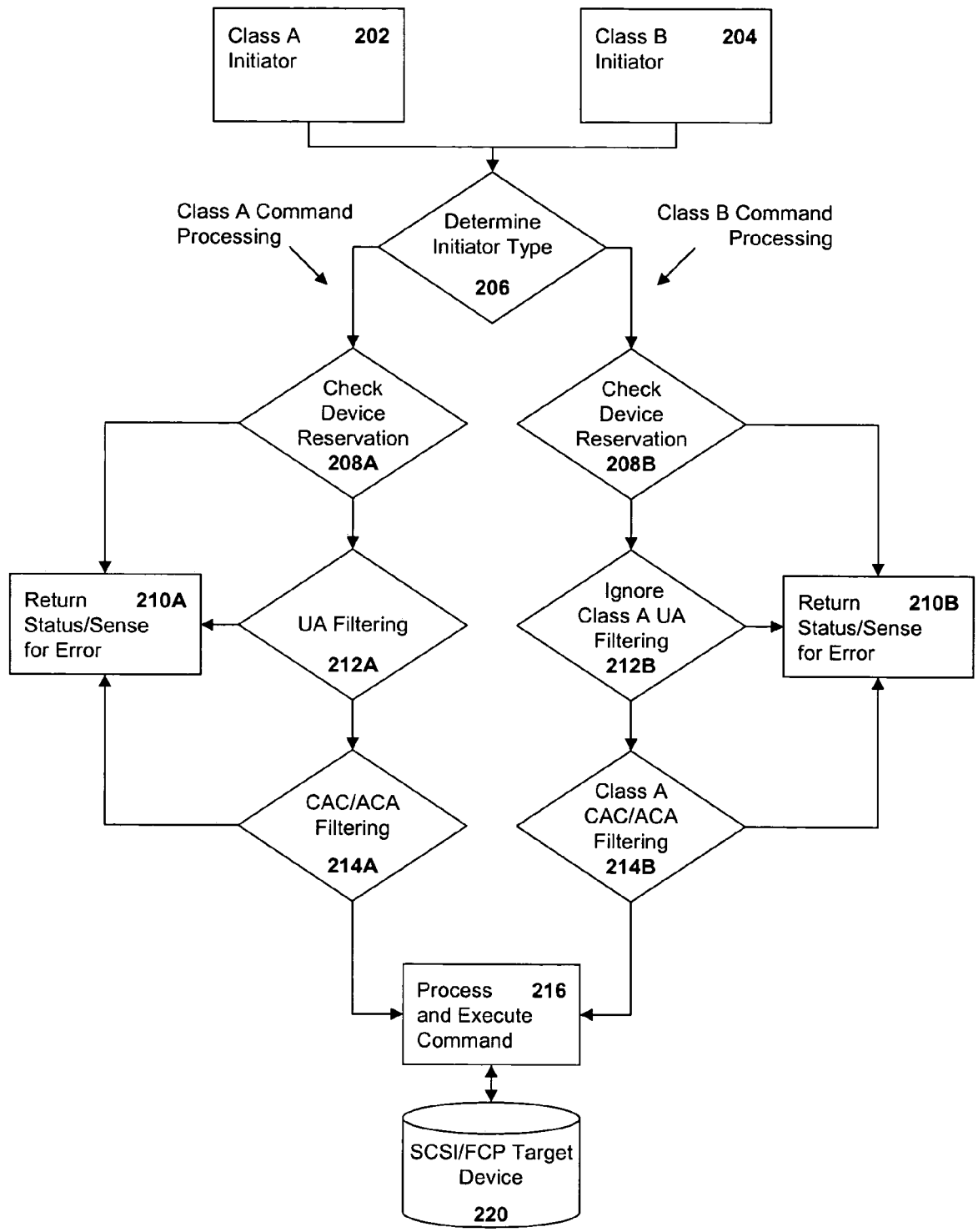
FIG. 2 is a flow chart of concurrent primary and host access to a secondary PPRC/FCP device through independent error management in accordance with certain described implementations of the invention.

A preferred method of independent error management is illustrated in flow chart form in FIG. 2. Initially a determination must be made whether a class A initiator 202 or a class B initiator 204 has issued a command to the SCSI/FCP target device 220 and the command must be filtered accordingly (step 206). The initiator type of the originator of the command is determined from login information. Next, a determination must be made if the SCSI/FCP target device 220 is reserved to one class of initiator or the other (step 208A, 208B). If a reservation exists, a non-conforming command will be rejected if the initiator type making the command does not have the right to access the reserved SCSI/FCP target device 220 (steps 210A, 210B). Thus, if the SCSI/FCP target device 220 is reserved to a class B initiator, special command filtering may be imposed so that a class A initiator 202 will be able to read from the secondary target device 220 but not issue media altering commands or remove the reserve.

SCSI protocol UA filtering is applied to class A initiator 202 commands (step 212A). If conditions cause UA to be set, then the UA condition would only apply to a class A initiator 202 and not affect a class B initiator 204. Thus, UA on the SCSI/FCP target device 220 set due to a class A initiator 202 will not affect class B initiator 204 commands and the class B command will be processed (step 212B). Similarly, if the SCSI/FCP target device 220 is in CAC or ACA condition due to class A initiator 202 behavior (step 214A), the CAC/ACA state on the device only applies to a class A initiator 202. With respect to a class A initiator 202, the CAC/ACA condition is handled pursuant to standard SCSI protocols. A class B initiator 204 is not affected by CAC/ACA conditions on the SCSI/FCP target device 220 due to class A initiator 202 activities (step 214B). In addition, a class B initiator 204 will not cause CAC/ACA conditions on the secondary target device 220 which would affect a class A initiator 202. Upon completion of the independent error management, the secondary target device 220 may process the command for the device allowing the initiator to access media if necessary for the command and complete the command with good status (step 216).

Three error management scenarios described below that detail independent error management on a SCSI/FCP target device 220 with two class of initiators accessing the device.

Scenario 1—Class A Initiator and Class B Initiator No Error Recovery—Good Path

A class A initiator 202 issues a read command to a SCSI/FCP target device 220 which is a PPRC secondary device and reserved to a PPRC/FCP (class B) initiator. Initiator login information is used to determine the command is from a class A initiator (step 206). The read command is allowed through the reservation by class B on the target device (step 208A). No UA condition exists on the SCSI/FCP target 220, so the read is allowed through to the next level of filtering (step 212A). No CAC/ACA condition exists on the SCSI/FCP target device 220 so the read is allowed through to be processed (step 214A). The read command is executed successfully (step 216). The command completes with data transfer and good status presented to the class A initiator 202 for the read command.

Next, a class B initiator 204 issues a write command to the SCSI/FCP target device 220. The command is determined to be originated by a class B initiator 204 based on initiator login information. The write command is allowed through the reservation by class B initiator since the target is reserved to it (step 208B). No UA condition is present on the device, however target filtering for class B initiator commands would be check conditioned for a UA condition on the target (step 212B). No CAC/ACA condition exists on the target, but commands from a class B initiator would not be affected by the CAC/ACA state (step 214B). Thus, the write is allowed to continue to be processed. The write command is executed successfully (step 216) and good status is presented to the class B initiator 204.

Scenario 2—Class A Error Recovery and Its Effect on Class B

A class A initiator 202 issues a write command to the SCSI/FCP target device 220. Based on initiator login information the command is determined to be from a class A initiator (step 206). The write command is failed due to a reservation by a class B initiator 204 on the target device (step 208A). The SCSI/FCP target device 220 will return a reservation/conflict status to the class A initiator for that command (step 210A). The class A initiator 202 will not be allowed to release the class B reserve. If a release command were to be issued to the SCSI/FCP target device 220 it will be failed.

The second scenario continues assuming a class A initiator 202 issues a LUN reset message to the SCSI/FCP target device 220. The message would be identified based on initiator login information as originating from class A initiator (step 206). The LUN reset message would be processed and would be executed on behalf of the class A initiator (step 216). Unit attentions are now maintained on the device for class A initiators according to known SCSI protocol. However, the class B reservation on the device is not removed.

Next the class B initiator 204 issues a write command to the SCSI/FCP target device 220. The command is determined to be from a class B initiator (step 206). The write command is allowed through the reservation by class B (step 208B). There is a UA condition set on target device due to a class A initiator 202 issuing a LUN reset message. However, since the pending write command is issued by a class B initiator 204 the UA condition is not presented (step 212B), and the command continues to be processed for execution. No CAC/ACA condition exists on the target device (step 214B) and the write is allowed through for execution on the target. The write command is executed successfully (step 216) and good status is returned to the class B initiator 204.

The second scenario continues after the UA has been cleared by subsequent class A initiator activity. The class A initiator 202 then issues an invalid command to the SCSI/FCP target device 220. For example a read command to blocks beyond the size of the target device. The command is filtered and determined to be from a class A initiator 202. The read command is allowed through the reservation on the target by the class B initiator (step 208A). No UA condition now exists on the target, so filtering continues (step 212A). No CAC/ACA condition exists on the target so the read is allowed through for processing (step 214A). Upon processing, the read command is failed and the command is check conditioned per known SCSI protocol. CAC or ACA (depending on NACA bit setting. SCSI-2/SCSI-3 protocol) condition is set on the SCSI/FCP target device 220. The command is failed back to the originating initiator, and check condition status is presented to the class A initiator 202 with appropriate sense data.

Next, a class B initiator 204 issues a write command to the SCSI/FCP target device 220. The command is determined to be from class B initiator (step 206). The write command is passed through the reservation on the target by the class B initiator (step 208B). A CAC/ACA condition now exists on the target device due to the previous failed class A initiator read. The class B initiator command is not failed due to CAC/ACA conditions on the target caused by a class A activity, so the write is allowed to continue for processing (step 214B). The CAC/ACA state on the device is not altered and is maintained for the class A initiators. The write command is executed successfully (step 216). Good status is presented to the class B initiator 204.

Scenario 3—Class B Error Recovery and Its Effect on Class A

The third independent error management scenario commences with the class B initiator 204 issuing a write command to the SCSI/FCP target device 220 with an error, for example, an invalid value in a field in the CDB. The command is filtered, and determined to be from class B initiator (step 206). The write command is allowed to pass the reservation on the device since it is held by a class B initiator (step 208B). No UA condition exists on the target (step 212B), and no CAC/ACA condition exists (step 214B) on the target device so the write is allowed through to execution. The write command is failed however due to the invalid CDB field value (step 216). The command is check conditioned, however, no CAC/ACA condition is set on the target device since this command originated from a class B initiator 204. Check condition status is presented to the class B initiator 204 with the appropriate sense per known SCSI protocol.

Subsequently, a class A initiator 202 issues a read command to the SCSI/FCP target device 220. The command is determined to be from class A initiator (step 206). The read command is allowed through the reservation by the class B initiator on the target (step 208A). No UA condition exists (step 212A), and no CAC/ACA condition exists (step 214A) on the device with respect to a class A initiator. The read is allowed through for execution. The read command is executed successfully (step 216) and good status is presented to the class A initiator 202.

Alternative Embodiments

An alternate implementation of independent error management by the target device 101 is based upon the separate maintenance of UA and CAC/ACA error conditions for each initiator class. Thus, the target device 101 would maintain class A UA, and separate class B UA. Similarly, the target device 101 would maintain class A CAC/ACA status separate and independent of class B CAC/ACA status. Each class of error would only affect the corresponding class of initiator.

Fully mutually exclusive and independent error handling for each initiator class is maintained to prevent errors from one initiator class from affecting the access or commands originating with initiators of the other initiator class. Thus, two different classes of error handling behavior are managed by the target device 101 which then enables support of concurrent access to the target device by the different initiator classes. The alternative embodiment allows a reduction in the number of filter layers necessary to implement independent error management.

Separate Mode page data may also be individually maintained for the device for each initiator class as well.

Command processing by the target device 101 would follow a similar flow as described above with respect to FIG. 2. Common reservation would be maintained on the target device 101 pursuant to known SCSI protocol. Exceptions would occur after identifying the class of initiator which originated the command (step 206). In particular, UA and CAC/ACA states are maintained separately for each initiator class and applied during command filtering only to the corresponding class. Thus, in the alternative embodiment, wholly separate independent error management is maintained, reducing the filtering complexity.

The described techniques for concurrent PPRC/FCP and host access to secondary PPRC/FCP device through independent error management may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., magnetic storage medium such as hard disk drives, floppy disks, tape), optical storage (e.g., OD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. Of course, those skilled in the art will recognize that many modifications may be made to this configuration without departing from the scope of the implementations and that the article of manufacture may comprise any information bearing medium known in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of error management in a data storage system having a target device, the target device receiving commands from a first initiator and the target device concurrently receiving commands from a second initiator, the method comprising managing errors associated with a command sent to the target storage device from the first initiator independently from errors associated with a command sent to the target device from the second initiator and preventing errors associated with a command directed to the target device from one of the first initiator and the second initiator from affecting access to the target device by the other of the first initiator and the second initiator.

2. The method of claim 1 wherein the first initiator communicates with the target device through Small Computer Systems Interface (SCSI) protocol and the second initiator communicates with the target storage device through Peer-to-Peer Remote Copy (PPRC) initiator mode commands.

3. The method of claim 1 wherein managing errors associated with a command sent to the target device from the first initiator independently from errors associated with a command sent to the target device from the second initiator comprises:
   determining the initiator type which has issued a command to the target device;
   applying a first error recovery procedure to manage errors associated with a command directed to the target device from the first initiator; and
   applying a second error recovery procedure to manage errors associated with a command directed to the target device from the second initiator.

4. The method of claim 3 wherein the first error recovery procedure differs from the second error recovery procedure.

5. The method of claim 1 further comprising allowing only one of the first initiator and the second initiator to have write access to the target device at a select time.

6. The method of claim 1 wherein the first initiator is a server and the second initiator is a storage device.

7. The method of claim 6 wherein the storage device is a PPRC primary storage device and the target device is a PPRC secondary storage device communicating with the PPRC primary storage device.

8. A target device of a data storage system, the target device receiving commands from a first initiator and concurrently receiving commands from a second initiator, the target device comprising means for managing errors associated with a command sent to the target device from the first initiator independently from errors associated with a command sent to the target device from the second initiator and means for preventing errors associated with a command directed to the target device from one of the first initiator and the second initiator from affecting access to the target device by the other of the first initiator and the second initiator.

9. The target device of claim 8 wherein the first initiator communicates with the target device through Small Computer Systems Interface (SCSI) protocol and the second initiator communicates with the target device through Peer to Peer Remote Copy (PPRC) initiator mode commands.

10. The target device of claim 8 further comprising:
    means for determining the initiator type which has issued a command to the target device;
    means for applying a first error recovery procedure to manage errors associated with a command directed to the target device from the first initiator; and
    means for applying a second error recovery procedure to manage errors associated with a command directed to the target device from the second initiator.

11. The target device of claim 10 wherein the first error recovery procedure differs from the second error recovery procedure.

12. The target storage device of claim 8 further comprising means for allowing only one of the first initiator and the second initiator to have write access to the target device at a select time.

13. The target device of claim 8 wherein the first initiator is a server and the second initiator is a storage device.

14. The target device of claim 13 wherein the storage device is a PPRC primary storage device and the target device is a PPRC secondary storage device communicating with the PPRC primary storage device.

15. An article of manufacture for use in programming a data storage system to manage errors, the data storage system having a target device, the target device receiving commands from a first initiator and the target device concurrently receiving commands from a second initiator, the article of manufacture comprising a storage medium having logic embedded therein to cause components of the data storage system to manage errors associated with a command sent to the target device from the first initiator independently from errors associated with a command sent to the target device from the second initiator and to cause components of the data storage system to prevent errors associated with a command directed to the target device from one of the first initiator and the second initiator from affecting access to the target device by the other of the first initiator and the second initiator.

16. The article of manufacture of claim 15 wherein the logic causes the first initiator to communicate with the target device through Small Computer Systems Interface (SCSI) protocol and the logic further causes the second initiator to communicate with the target device through Peer to Peer Remote Copy (PPRC) initiator commands.

17. The article of manufacture of claim 15 wherein the logic further causes components of the data storage system to manage errors associated with a command sent to the target device from the first initiator independently from errors associated with a command sent to the target device from the second initiator by:
   determining the initiator type which has issued a command to the target device;
   applying a first error recovery procedure to manage errors associated with a command directed to the target device from the first initiator; and
   applying a second error recovery procedure to manage errors associated with a command directed to the target device from the second initiator.

18. The method of claim 17 wherein the first error recovery procedure differs from the second error recovery procedure.

19. The article of manufacture of claim 15 wherein the logic further causes components of the data storage system to allow only one of the first initiator and the second initiator to have write access to the target device at a select time.

20. The article of manufacture of claim 15 wherein the first initiator is a server and the second initiator is a storage device.

21. The article of manufacture of claim 20 wherein the storage device is a PPRC primary storage device and the target device is a PPRC secondary storage device communicating with the PPRG primary storage device.

* * * * *